Patented June 19, 1934

1,963,175

UNITED STATES PATENT OFFICE 1,963,175

REMOVAL OF WAX FROM OIL

Thomas Wallace Quinn, Drexel Park, Pa., assignor to The Atlantic Refining Company, Philadelphia, Pa., a corporation of Pennsylvania No Drawing. Application March 5, 1932, Serial No. 597,088

9 Claims. (Cl. 196—19)

The present invention relates to the art of removing wax from wax-containing oil, and more particularly to a process in which a substance is added to the wax-containing oil, thereby to condition the oil so that the wax may be more readily separated therefrom.

My invention resides in adding a high boiling hydrocarbon distillate to a wax-containing oil before the oil is subjected to any of the well known wax separation operations, and after such addition, subjecting the oil to a separating operation, as for example, cold settling, centrifuging, filtering, or the equivalent.

The materials which I employ to agglomerate or otherwise condition the wax so that it will separate more easily from the oil, may be broadly referred to as high boiling or heavy distillates. Such distillates may be obtained by the distillation of heavy oils or bituminous materials, carried out at temperatures at which coking will occur. For example, the last overhead cut or distillate which in the distillation of petroleum containing heavy fractions, comes over before the residual petroleum components turn to coke, I consider a preferred heavy distillate for my process. However, the conditioning material which I employ may be obtained in other ways, as for example, by the vacuum distillation of hydrocarbon residua.

I recognize that residual compounds contained in petroleum, as well as residual coal tar compounds, have been added to a wax-containing oil to render separation of wax therefrom easier. An advantage of my process over these is that the discoloration which accompanies the addition of residua is minimized or avoided.

The agglomerating or conditioning materials which I employ may be added directly to the wax-containing oil prior to the actual carrying out of the dewaxing operation; or the heavy distillates may first be diluted, as for example, with naphtha, then added. The proportion of heavy distillate added to the oil-wax mixture, in accordance with my invention, may be of the order of from one part of the former to about from 50 to 500 parts of the latter. When, in accordance with my invention, heavy distillates, either alone or diluted, are added to wax-containing oils, it is preferred that such addition be made while the oils are in a warm condition, for example, at temperatures of the order of 70° F., or above. After the addition, the wax-containing oil may be treated by any of the well known procedures for removing wax from oil, as for example, by the cold settling process which involves cooling the mixture sufficiently to solidify the wax and allowing the mixture to stand; or by the centrifuging process in which the mixture is first cooled, then passed into a centrifuge; or by filtering the oil-wax mixture, after chilling, through a suitable filtering medium. However, my invention is not limited to any specific separating process nor to processes involving chilling.

In separating wax from oil by processes involving chilling, it will be understood that the temperature to which the wax-containing oil is chilled, depends largely upon the particular pour point desired of the ultimate oil product. In general, chilling of the wax-containing oil to a temperature of the order of about 10° F., or below, according to the pour-point desired, will produce satisfactory results. However, in that specific aspect of my invention involving a chilling step, I do not contemplate being limited to any particular temperatures of chilling.

By addition of heavy distillates of the type aforesaid, the wax content of the wax-containing oil forms larger crystals or crystal agglomerates during the chilling than when unaided by such materials, and, as a result, the separation of solid from liquid may be more readily effected. The wax will separate more readily from the oil both with regard to rate and completeness of separation.

Whether or not it is desirable to add a light diluent to the wax-containing oil prior to or during my process for wax removal is considered to be a factor of control which will be readily apparent to one skilled in the art. Substantially the same conditions with respect thereto apply in my process as in the separation of wax from oil when no wax agglomerating agent is employed; for example, in the case of a very viscous wax-containing oil, dilution of the oil with some suitable light diluent, as for example, naphtha, may be desirable.

Herein, and in the appended claims when the term "heavy hydrocarbon distillates", "higher boiling hydrocarbon fractions" or equivalent expressions are employed, such terms are intended to include those higher boiling hydrocarbon distillates obtained from heavy hydrocarbon or bituminous materials when the same are reduced to substantially solid bottoms, or when a bituminous residue is distilled, and which when added, in relatively small amounts of the order herein indicated, to the oil-wax mixture, are capable of aiding in conditioning the wax so that its separation from the oil can be more easily and readily accomplished. The amount of the heavy distillates added in accordance with my invention, is so small that it will to no appreciable or at least substantial extent, affect the quality of either the separated oil or the separated wax.

Summarily, the advantages gained by my invention are: (1) little, if any, discoloration of the wax-bearing oil due to the dewaxing treatment is caused, and (2) there is an avoidance of addition of undesirable asphaltic materials.

Exemplary of my process, but not to be construed as limiting, I may first dilute a lubricating stock containing wax, for instance, a high viscosity fraction resulting from the non-cracking distillation of a Mid-Continent crude petroleum, with about half its own volume of naphtha. To this diluted stock I add about .4% by volume of a portion of the last 10% cut that distills over when an 8% pipe still bottoms from a mixed base crude is run to coke. This addition is made while the oil-wax mixture is at a temperature sufficiently high so that it is entirely liquid in order to permit complete intermingling, i. e., at a temperature of about 150° F. Intermingling is expedited by agitating. The mixture is then cooled to about +5° F., whereupon the wax quickly separates from the oil, and may be removed by centrifugation.

It is pointed out that whether or not the oil-wax mixture or the heavy distillate is diluted with naphtha or the equivalent prior to, simultaneously with, or subsequently to the addition of the one to the other, will depend upon a number of factors including the character of the oil-wax mixture, the character of the heavy distillate, and details of operation to be followed in the separating step proper.

By way of more particularly identifying specific forms of heavy hydrocarbon distillates which I may employ in my process, but without intending to impose any limitation upon the broader aspects of my invention, such distillates may, for example, be of petroleum origin and commonly known in the art as "wax tailings" and may have characteristics somewhat as follows:

|  | Heavy distillate | |
| --- | --- | --- |
|  | #1 | #2 |
| Specific gravity | 1.1337 | 1.1240 |
| Flash (open cup) | 475° F. | 415° F. |
| Fire (open cup) | 565° F. | 505° F. |
| A. S. T. M. standard penetration test {penetration at 77° F. | 45 |  |
| penetration at 32° F. | 4 |  |
| penetration at 115° F. | 360+ |  |
| Melting point (ball and ring) | 119° F. | 103° F. |
| Percent soluble in CS$_2$ | 99.5 | 98.8 |
| Percent soluble in CCl$_4$ | 98.7 | 97.9 |
| Percent insoluble in 86° nap | 33.6 | 14.1 |
| Percent fixed carbon | 8.51 | 5.31 |
| Percent sulfur | 2.61 | 2.33 |
| Saybolt Universal vis. at 210° F. | 1129 | 310 |

Another specific form of a distillate which may be employed are the so-called "green oils" obtained as the last overhead fraction in the distillation of coal, coal tar and the like.

What I claim is:

1. In the art of dewaxing wax-containing oils involving separation of wax from oil, the step of preparing the oil for separation of wax therefrom, which comprises adding thereto a heavy hydrocarbon distillate comprising high boiling fractions obtained by distilling hydrocarbon residues until they become substantially solid.

2. In the art of dewaxing wax-containing oils involving separation of wax from oil, the step of preparing the oil for separation of wax therefrom, which comprises adding thereto a high boiling hydrocarbon distillate obtained by vacuum distillation of hydrocarbon residues.

3. In the art of dewaxing wax-containing oils involving separation of wax from oil, the step of preparing the oil for separation of wax therefrom which comprises adding to the oil a high boiling distillate of a heavy hydrocarbon fraction obtained as a result of distilling said fraction until a residue of coke is formed.

4. In a process for dewaxing a wax-containing oil involving separation of wax from oil, the steps which comprise diluting the oil with a solvent which will not to substantial extent react with the oil, and adding to the oil a heavy hydrocarbon distillate comprising high boiling fractions obtained when hydrocarbon residues are distilled to substantially solid form, whereby the wax is rendered more easily separable from the oil.

5. In a process for dewaxing a wax-containing oil involving separation of wax from oil, the steps which comprise diluting the oil with a solvent which will not to substantial extent chemically react with the oil, incorporating with the diluted oil a heavy hydrocarbon distillate comprising high boiling fractions obtained when hydrocarbon residues are distilled to substantially solid form, thereby to condition the oil to cause wax agglomeration, and chilling the diluted oil to cause solidification of wax.

6. A process for dewaxing a wax-containing oil, which comprises adding to the oil a heavy hydrocarbon distillate comprising high boiling fractions obtained when hydrocarbon residues are distilled to substantially solid form, thereby to condition the wax-containing oil to cause agglomeration of wax therein, chilling the oil, and removing wax from the oil.

7. A process for dewaxing a wax-containing oil which comprises dissolving in the oil while it is at a temperature in excess of +10° F., a heavy hydrocarbon distillate comprising high boiling fractions obtained when hydrocarbon residues are distilled to substantially solid form, thereby to condition the oil so that wax agglomeration will occur when the oil is cooled sufficiently to solidify wax contained therein, thereafter cooling the oil to below +10° F. to cause solidification of wax, and while at such reduced temperature, removing the wax therefrom.

8. A process for dewaxing a wax-containing oil which comprises heating the oil, dissolving in the heated oil a heavy hydrocarbon distillate comprising high boiling fractions obtained when hydrocarbon residues are distilled to substantially solid form, thereby to condition the oil so that wax agglomeration will occur when the oil is cooled sufficiently to solidify the wax contained therein, thereafter cooling the oil to below +10° F. to cause solidification of wax and while the oil is at such reduced temperature removing wax therefrom.

9. A process for dewaxing a wax-containing oil which comprises diluting the oil, thereafter heating the oil to a temperature of the order of from 70° F. to 150° F., dissolving in the heated oil a small quantity of a heavy hydrocarbon distillate comprising high boiling fractions obtained when hydrocarbon residues are distilled in substantially solid form, thereby to condition the oil so that wax agglomeration will occur when the oil is sufficiently cool to solidify the wax contained therein, thereafter cooling the oil to a temperature of the order of +10° F. thereby to cause solidification of wax, and while the oil is at such reduced temperature removing wax therefrom.

THOMAS WALLACE QUINN.

DISCLAIMER 1,963,175.—*Thomas Wallace Quinn*, Drexel Park, Pa. REMOVAL OF WAX FROM OIL. Patent dated June 19, 1934. Disclaimer filed August 13, 1936, by the patentee; the assignee, *The Atlantic Refining Company*, assenting.

Hereby enters this disclaimer to claims 1, 3, 4, 5, and 6 of said Letters Patent.
[*Official Gazette September 1, 1936.*]